Patented Aug. 8, 1950

2,517,563

UNITED STATES PATENT OFFICE 2,517,563

SYNTHETIC TRICARBOXYLIC ACID AND METHOD OF PREPARATION

George C. Harris, Wilmington, Del., assignor to Hercules Powder Company, Wilmington, Del., a corporation of Delaware No Drawing. Application May 4, 1946, Serial No. 667,495

13 Claims. (Cl. 260—101)

This invention relates to an addition product and to a method for its production, and more specifically it relates to the Diels-Alder addition product of a resin acid and fumaric acid and to a method for the production thereof.

It is known to produce a resinous material of high acid number by reaction of rosin and fumaric acid. Thus, in U. S. Patent 2,039,243 Krzikalla and Wolff show the reaction of rosin and fumaric acid at 150–250° C. to produce a material which they describe as similar to that derived from rosin and maleic anhydride, since water is removed and the fumaric acid is converted into maleic anhydride during the reaction. Also, in U. S. Patent 2,359,980 Fleck describes the production of the addition product of levo-pimaric acid and maleic anhydride, the addition product being characterized by its crystalline nature and by a melting point of about 225° C. by the capillary method. The materials prepared in accordance with the teachings of these patents are useful in the preparation of synthetic resins which, when reacted with polyhydric alcohols, may be employed in the manufacture of certain coating compositions and for other purposes. Coating compositions prepared from these materials, however, have suffered from a disadvantage in that they possess poor outdoor durability and hence discolor and deteriorate when subjected to sunlight. Much effort has therefore been exerted to find similar materials which could be employed in the manufacture of coating compositions having improved stability when subjected to the action of ultra-violet light.

In accordance with this invention, there has now been prepared a synthetic tricarboxylic acid which may be esterified to form resins which have the desired stability under ultraviolet radiation, and which also has other advantageous properties which are described in greater detail hereinafter. This synthetic material has the structural formula of the Diels-Alder addition product of levo-pimaric acid and fumaric acid, and is characterized by substantial stability when heated at 250° C., by substantial resistance to deterioration when subjected to ultraviolet radiation, and by an acid number of 397–405. When precipitated from solution in benzene by the addition of isopropyl alcohol, this material has a melting point of 255–257° C. by the capillary method. When associated with 1.5 mols of acetic acid of crystallization per mol of addition product, the product of this invention is characterized by an (alpha)$_D^{24}$ of plus 29–33° in 2% solution in absolute ethyl alcohol, a per cent hydroxyl radical by the Zerewitinoff method of 15.0–15.5, a per cent carbon of 63.8–64.3, and a per cent hydrogen of 7.8–8.3.

This new compound is referred to herein as the levopimaric acid-fumaric acid adduct as a matter of convenience. It is more properly called levopimaric-6, 8a-transendosuccinic acid. It has the following structural formula:

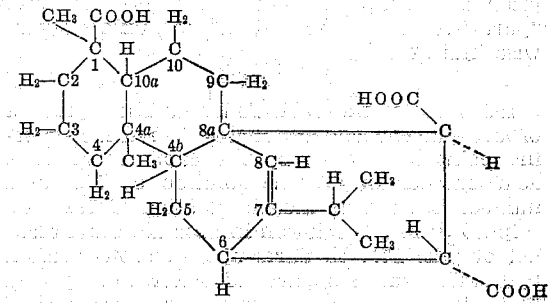

The essential feature of the method of this invention is the heating in water solution at 150–300° C. of a material having the structural formula of the Diels-Alder addition product of levopimaric acid and either maleic acid or maleic anhydride together with a sufficient amount of alkaline material to neutralize the mixture completely, heating being continued for a period of time sufficient to effect substantially complete isomerization of the maleic structural group to the corresponding fumaric group.

After the heat treating operation, the acidic material of this invention may be recovered from the water solution in accordance with various procedures. Thus, where the initial addition product which is neutralized is in substantially pure form and is characterized by a melting point by the capillary method of 222–228° C., by an acid number in acetone solution of 418–426, by an acid number in absolute alcohol solution of 278–283, and by an (alpha)$_D^{24}$ in 2% solution in absolute ethyl alcohol of plus 25 to plus 29, the product of this invention may be prepared after the heating at 150–300° C., by cooling the mixture and thereafter precipitating the product by the addition of acid.

On the other hand, where the initial material is an addition product of rosin and maleic anhydride in impure form, such as is obtained by the reaction of ordinary wood rosin and maleic anhydride at 160° C., the reaction product of this invention may be recovered, after isomerization and cooling, by neutralizing the water solution to a pH value of 6.0–6.5 with an acid, contacting the water solution with an organic solvent, which is a solvent for the resin acids and neutral bodies, separating the water phase from the solvent phase, and thereafter adding further acid to the water phase to precipitate the product of this invention. As another alternative, the reaction product, when prepared from the Diels-Alder addition product of rosin and maleic anhydride, may be recovered after the heat treatment and cooling steps by completely acidifying the water solution, contacting the precipitate with a water-miscible organic solvent such as acetic acid at a temperature within the range from about 40° C. to the incipient boiling point of the solvent and thereafter recovering the product in crystalline form by the addition of water thereto. Still another alternative is to contact the precipitate obtained by completely acidifying the water solution with a water-immiscible solvent which is a solvent for the desired adduct, the resin acids and neutral bodies. The resulting solution is then extracted with an aqueous sodium bicarbonate solution to remove the desired adduct which may be finally recovered by acidification of the bicarbonate solution.

Having thus indicated in a general way the nature and purpose of this invention, the following examples are included to illustrate the practice thereof. In the examples, the term "parts" represents units by weight, unless otherwise indicated.

Example 1

150 parts of the Diels-Alder addition product of levo-pimaric acid and maleic anhydride (melting point of 226° C. by the capillary method, acid number in acetone solution of 422, acid number in absolute alcohol solution of 281, and $(alpha)_D^{24}$ in 2% solution in absolute ethyl alcohol of plus 27), 45 parts of anhydrous sodium hydroxide, and 305 parts of water were placed in a nickel lined autoclave under a pressure of 1800 lb./sq. in. gauge of nitrogen. Reaction was carried out at 225° C. for a period of four hours using continued agitation. After cooling to room temperature, the solution was diluted with dioxane in the ratio of one volume of dioxane for every five volumes of solution. The solution was then completely acidified with hydrochloric acid, and the levo-pimaric acid-fumaric acid adduct separated therefrom. The amount of adduct recovered represented a yield of 93% (140 parts having an acid number of 398). The adduct exhibited substantial stability to the action of ultraviolet radiation, in comparison with the levo-pimaric acid-maleic anhydride addition product used as a starting material, and was also characterized by substantial stability when heated at 250° C. When precipitated from solution in benzene by the addition of isopropyl alcohol, the product had a melting point by the capillary method of 255-257° C. Also from solution in acetic acid, this material precipitated in association with 1.5 mols of acetic acid of crystallization, and this product containing the acetic acid of crystallization had the following properties: $(alpha)_D^{24}$ in 2% solution in ethyl alcohol of plus 31°, per cent hydroxyl by the Zerewitinoff method of 15.0-15.5, per cent carbon of 64.0-64.1, and per cent hydrogen of 8.0-8.1.

Example 2

20 parts of levo-pimaric acid-maleic anhydride addition product (90% purity, the impurities being unreacted resin acids and neutral bodies), 7 parts of anhydrous sodium hydroxide, and 50 parts of water were heat treated for 4 hours at 225° C. under pressure of 3600 lbs./sq. in. gauge of nitrogen as described in Example 1. After cooling to room temperature, the solution was diluted with water to three times its volume, acidified with hydrochloric acid to completely neutralize the components, thereby causing them to precipitate. The precipitate was taken up in ether. The ether solution was then extracted with a saturated aqueous sodium bicarbonate solution to separate the fumaric acid addition product from any free rosin acids and neutral bodies present. Upon neutralization of the bicarbonate extract by addition of a further quantity of hydrochloric acid, the desired levo-pimaric acid-fumaric acid adduct was isolated in 94% yield. The adduct so produced had the same properties as those of Example 1.

The initial addition product which is neutralized and heat treated in water solution may be prepared in accordance with procedures which are well understood in the art. For example, U. S. Patent 2,039,243 describes the reaction of ordinary wood rosin and maleic anhydride to yield an impure material which is suitable for use as the initial material which is neutralized and heat treated in accordance with the method of this invention. Particularly advantageous starting materials are those in substantially pure form consisting essentially of the Diels-Alder addition product of levo-pimaric acid and maleic anhydride. Such materials are described in U. S. Patent 2,359,980 and by Fleck and Palkin in vol. 14 of the Analytical Edition of the Industrial and Engineering Chemistry (1942), p. 146. In general, any material containing levo-pimaric acid, or any other resin acid which may be isomerized to levo-pimaric acid such as levo-abietic acid, etc., may be used to form a Diels-Alder addition product of levo-pimaric acid and maleic anhydride and thereafter employed in preparing the material to be neutralized in making the product of this invention. The material to be neutralized may be prepared from either maleic anhydride or maleic acid, since these materials will result in the production of identical products as final materials.

Generally speaking, as the alkaline material used in accordance with this invention, I may employ any inorganic compound of an alkali or alkaline earth metal which is alkaline in aqueous solution and which reacts with the levo-pimaric acid-maleic anhydride adduct to provide a reaction product soluble in water. The alkali metal compounds are preferred since they are characterized by forming water-soluble compounds with the levo-pimaric acid-maleic anhydride adduct. Thus, in place of the sodium hydroxide shown in the examples, there may be used sodium oxide, sodium carbonate, potassium hydroxide, lithium hydroxide, potassium carbonate, lithium carbonate, etc. It is necessary that sufficient alkali be added to the water solution to effect complete neutralization thereof, i. e., sufficient alkali must be employed to result in the formation of the trisodium, tripotassium, etc., salt of the levo-pimaric-maleic anhydride addition product. When less than this amount is used, e. g., an amount sufficient to form only the disodium, dipotassium, etc. salt, the heat treatment may result in the decomposition of the initial adduct to the extent of as much as 50%. The concentration of salts in water solution is not critical, however, and may be varied within a wide range. Thus, the isomerization by heat treatment step may be effectively accomplished using solutions containing from about 1% to about 40% by weight of solids. In the examples, the heat treatment was effected at a temperature of 225° C. In general, any temperature within the range about 150 and 300° C. has been found to be applicable in changing the maleic radical to the fumaric radical, but preferably temperatures within the range from about 200 to about 250° C. are employed. As a general rule, the isomerization will require from about 2 to about 6 hours, depending upon the temperatures at which the isomerization is effected. Because of the high temperatures employed, it is necessary that the isomerization step be conducted under superatmospheric pressure, and an inert atmosphere such as hydrogen or nitrogen is preferably employed in order to result in the production of the most desirable materials.

As previously stated, the handling of the water solution upon cooling will depend upon the properties of the initial addition product which is neutralized. Where this product is the adduct of levo-pimaric acid and maleic anhydride in essentially pure form, the water solution need be merely neutralized in order to precipitate the product of this invention. It has been found desirable, however, in some instances to add a comparatively minor amount of a water-miscible solvent to the solution prior to acidification to prevent gel formation. Suitable solvents are low molecular ketones such as acetone, methyl ethyl ketone, etc., low molecular alcohols such as methyl, or ethyl alcohol, water-miscible ethers such as dioxane, etc.

Where the initial adduct is associated with neutral bodies and unreacted resin acids, however, such neutral bodies and acids may be separated from the desired end product by acidifying the solution to precipitate the adduct, resin acids and neutral bodies, and thereafter contacting the precipitate with a material which is a water-miscible solvent for the reaction product of this invention and also for the neutral bodies and nonreactive resin acids, the contacting being performed at a temperature within the range from about 40° C. to the incipient boiling point of the solvent. Addition of water to the solvent containing in solution the reaction product of this invention will result in the precipitation of the reaction product itself, the neutral bodies and nonreactive resin acids remaining in solution. For this purpose, there may be employed any water-miscible organic solvent, such as acetic acid, dioxane, methanol, ethanol, etc. It is also possible to take up the precipitate with a water-immiscible solvent for the desired adduct, the resin acids and the neutral bodies, for example, ethyl ether. The resulting solution may then be extracted with an aqueous alkali bicarbonate solution to selectively remove the adduct. The adduct is recovered by acidification of the bicarbonate solution.

As another alternative, the products of this invention may be recovered after heat treatment and cooling of the water solution by adding acid until the solution has a pH value of 6.0–6.5, contacting the water solution with an organic solvent for the resin acids and neutral bodies, separating the two phases, and thereafter adding further acid to the water phase to precipitate the material of this invention. When this procedure is followed, acetic, hydrochloric, phosphoric, sulfuric, or any other organic or mineral acid, may be used as the acid precipitating agent, and benzene, ether, hexane, petroleum ether, and any other aromatic or aliphatic hydrocarbon solvent, are suitable organic solvents.

The reaction products prepared in accordance with this invention are unique and advantageous compositions of matter. Thus, they and the esters prepared from them are characterized by substantial resistance to deterioration when subjected to the action of ultraviolet light, in comparison with comparable products of the prior art. Furthermore, the reaction products of this invention are characterized by high stability when heated for a prolonged period of time at 250° C., and thus they are very desirable materials for use in the preparation of polyhydric alcohol esters. Such polyhydric alcohol esters are useful in the preparation of coating compositions, adhesive compositions, printing inks, etc., and may be used as a modifier for waxes, shellac substitutes, chewing gum bases, sizes, etc.

What I claim and desire to protect by Letters Patent is:

1. In the method for the preparation of levo-pimaric-6, 8a-transendosuccinic acid having the structural formula set forth in claim 13, the step which comprises heating in water solution at 150–300° C. a material having the structural formula of the Diels-Alder adduct of levopimaric acid and maleic anhydride together with a sufficient amount of alkaline material to neutralize the adduct completely, heating being continued for a period of time sufficient to effect substantially complete isomerization of the maleic group of atoms to the fumaric group.

2. In the method for the preparation of levo-pimaric-6, 8a-transendosuccinic acid having the structural formula set forth in claim 13, the step which comprises heating in water solution at 200–250° C. a material having the structural formula of the Diels-Alder adduct of levopimaric acid and maleic anhydride together with a sufficient amount of alkaline material to neutralize the adduct completely, heating being continued for a period of time sufficient to effect substantially complete isomerization of the maleic group of atoms to the fumaric group.

3. In the method for the preparation of levo-pimaric-6, 8a-transendosuccinic acid having the structural formula set forth in claim 13, the step which comprises heating in water solution at 200–250° C. a material having the structural formula of the Diels-Alder addition product of levo-pimaric acid and maleic anhydride together with a sufficient amount of sodium hydroxide to neutralize the material completely, heating being continued for a period of time sufficient to effect substantially complete isomerization of the maleic group of atoms to the fumaric group.

4. The method for the preparation of a synthetic material consisting essentially of levo-pimaric-6, 8a-transendosuccinic acid having the structural formula set forth in claim 13, said method comprising heating an aqueous solution of a material consisting essentially of the Diels-Alder addition product of levo-pimaric acid and maleic anhydride, completely neutralized with an alkaline material, heating being continued at 150–300° C. for a period of time sufficient to effect substantially complete isomerization of the maleic group of atoms to the fumaric group, cooling the solution, and thereafter precipitating the said synthetic material by the addition of an acidic material.

5. The method for the preparation of a synthetic material consisting essentially of levo-pimaric-6, 8a transendosuccinic acid having the structural formula set forth in claim 13, said method comprising heating an aqueous solution of a material consisting essentially of the Diels-Alder addition product of levo-pimaric acid and maleic anhydride, completely neutralized with an alkaline material, heating being continued at 200–250° C. for a period of time sufficient to effect substantially complete isomerization of the maleic group of atoms to the fumaric group, cooling the mixture, and thereafter precipitating the said synthetic material by the addition of hydrochloric acid.

6. The method which comprises heating a material comprising the Diels-Alder addition product of levo-pimaric acid and maleic anhydride in admixture with water and sufficient alkaline material to effect complete neutralization thereof, heating being continued at 150–300° C. for a period of time sufficient to effect substantially complete isomerization of the maleic radical to the fumaric radical, neutralizing the solution with acid to a pH value of 6.0–6.5, contacting the solution with a liquid hydrocarbon which is water-immiscible but a solvent for the resin acids and neutral bodies contained in the starting material, separating the water phase from the solvent phase, and thereafter adding sufficient acid to the water phase to precipitate a material consisting essentially of levopimaric-6, 8a-transendosuccinic acid having the structural formula set forth in claim 13.

7. The method which comprises heating a material comprising the Diels-Alder addition product of levo-pimaric acid and maleic anhydride in admixture with water and sufficient alkaline material to effect complete neutralization thereof, heating being continued at 200–250° C. for a period of time sufficient to effect substantially complete isomerization of the maleic radical to the fumaric radical, neutralizing the solution with acid to a pH value of 6.0–6.5, contacting the solution with a liquid hydrocarbon which is water-immiscible but a solvent for the resin acids and neutral bodies contained in the starting material, separating the water phase from the solvent phase, and thereafter adding sufficient acid to the water phase to precipitate a material consisting essentially of levopimaric-6, 8a-transendosuccinic acid having the structural formula set forth in claim 13.

8. The method which comprises heating a material comprising the Diels-Alder addition product of levo-pimaric acid and maleic anhydride in admixture with water and sufficient sodium hydroxide to effect complete neutralization thereof, heating being continued at 200–250° C. for a period of time sufficient to effect substantially complete isomerization of the maleic radical to the fumaric radical, neutralizing the solution with hydrochloric acid to a pH value of 6.0–6.5, contacting the solution with benzene, separating the water phase from the solvent phase, and thereafter adding sufficient hydrochloric acid to the water phase to precipitate a material consisting essentially of levopimaric-6, 8a-transendosuccinic acid having the structural formula set forth in claim 13.

9. The method which comprises heating a material comprising the Diels-Alder addition product of levo-pimaric acid and maleic anhydride in admixture with water and sufficient alkaline material to effect complete neutralization thereof, heating being continued at 150–300° C. for a period of time sufficient to effect substantially complete isomerization of the maleic radical to the fumaric radical, completely acidifying the solution, contacting the resulting precipitate with a water-miscible organic solvent, and thereafter adding water to the resulting solution to precipitate a material consisting essentially of levo-pimaric-6, 8a-transendosuccinic acid having the structural formula set forth in claim 13.

10. The method which comprises heating a material comprising the Diels-Alder addition product of levo-pimaric acid and maleic anhydride in admixture with water and sufficient alkaline material to effect complete neutralization thereof, heating being continued at 200–250° C. for a period of time sufficient to effect substantially complete isomerization of the maleic radical to the fumaric radical, completely acidifying the solution, contacting the resulting precipitate with a water-miscible organic solvent, and thereafter adding water to the resulting solution to precipitate a material consisting essentially of levopimaric-6, 8a-transendosuccinic acid having the structural formula set forth in claim 13.

11. The method which comprises heating a material comprising the Diels-Alder addition product of levo-pimaric acid and maleic anhydride in admixture with water and sufficient sodium hydroxide to effect complete neutralization thereof, heating being continued at 200–250° C. for a period of time sufficient to effect substantially complete isomerization of the maleic radical to the fumaric radical, completely acidifying the solution with hydrochloric acid, contacting the resulting precipitate with acetic acid, and thereafter adding water to the resulting solution to precipitate a material consisting essentially of levopimaric-6, 8a-transendosuccinic acid having the structural formula set forth in claim 13.

12. The method which comprises heating a material comprising the Diels-Alder addition product of levo-pimaric acid and maleic anhydride in admixture with water and sufficient alkaline material to effect complete neutralization thereof, heating being continued at 150–300° C. for a period of time sufficient to effect substantially complete isomerization of the maleic radical to the fumaric radical, completely acidifying the solution, contacting the resulting precipitate with a water-immiscible organic solvent, separating the aqueous phase from the phase immiscible therewith, contacting the water-immiscible phase with an aqueous alkali bicarbonate solution to extract levopimaric-6, 8a-transendosuccinic acid having the structural formula set forth in claim 13, precipitating the addition product from the aqueous solution by acidification, and recovering said precipitate.

13. Levopimaric-6, 8a-transendosuccinic acid which has the following structural formula:

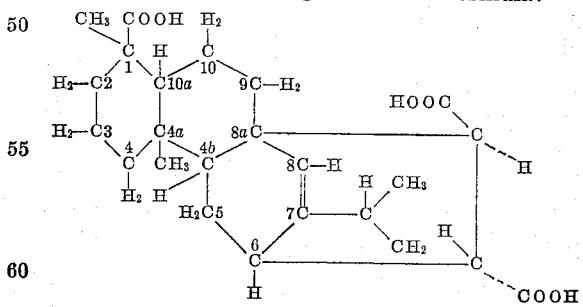

GEORGE C. HARRIS.

REFERENCES CITED

The following references are of record in the file of this patent:

UNITED STATES PATENTS

| Number | Name | Date |
|---|---|---|
| 2,351,949 | Georgi | June 20, 1944 |
| 2,383,933 | Bump | Sept. 4, 1945 |

OTHER REFERENCES

Karrer: "Organic Chemistry," 1938, Nordemann Publ. Co., p. 256.